J. E. OLLIVIER.
DEVICE FOR TRANSFORMING A MOTOR CAR INTO A SLED.
APPLICATION FILED OCT. 5, 1914.
1,225,998.
Patented May 15, 1917.
3 SHEETS—SHEET 1.
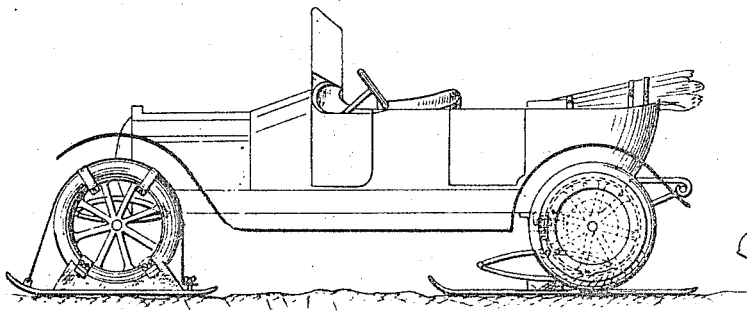
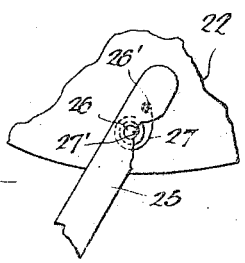
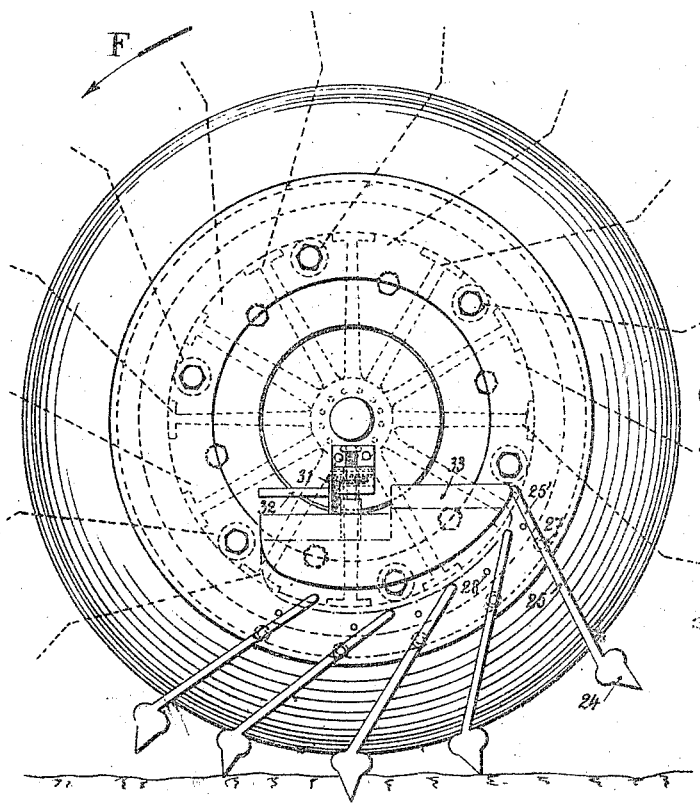
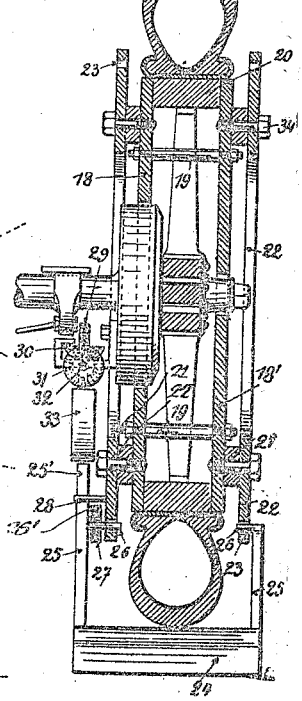

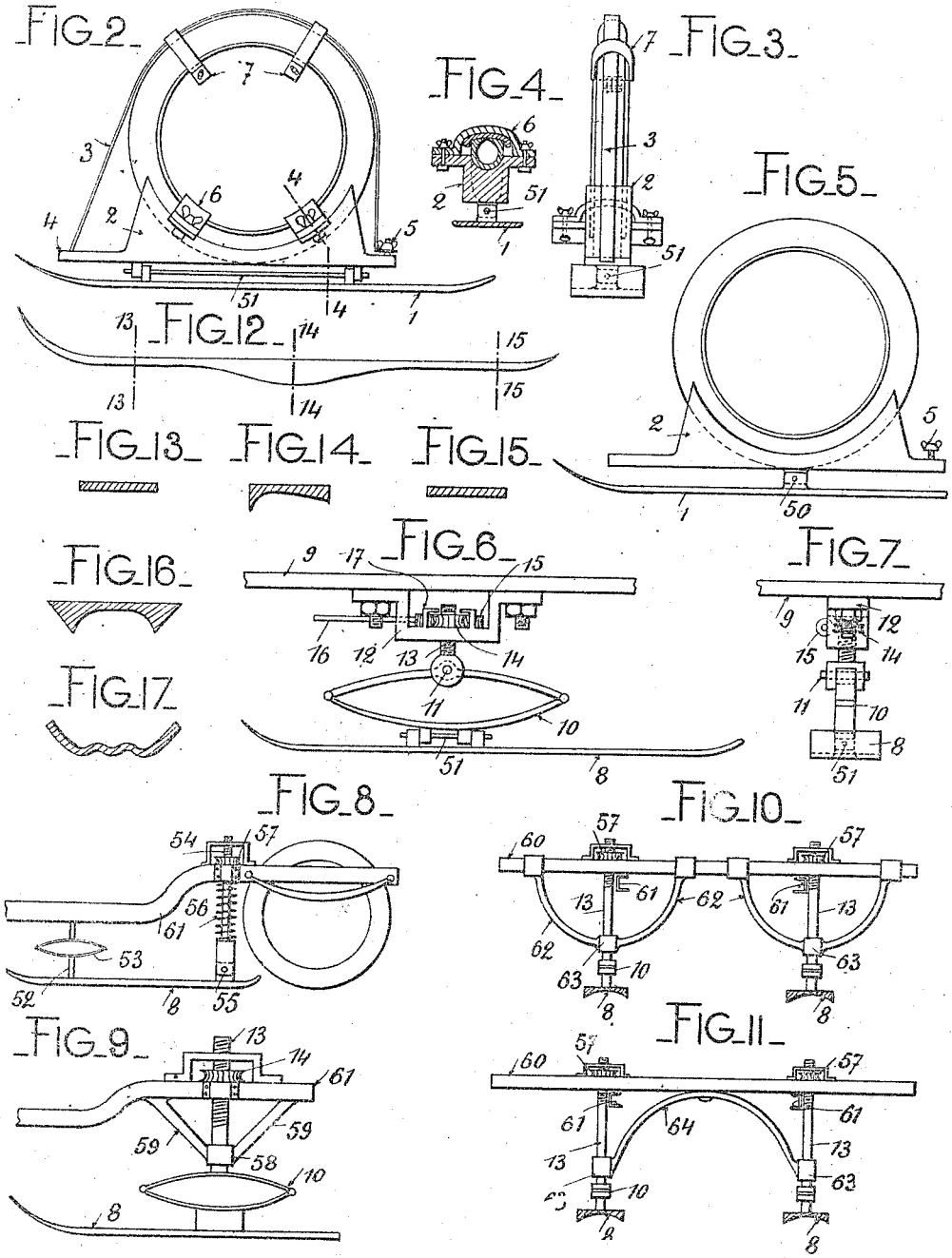

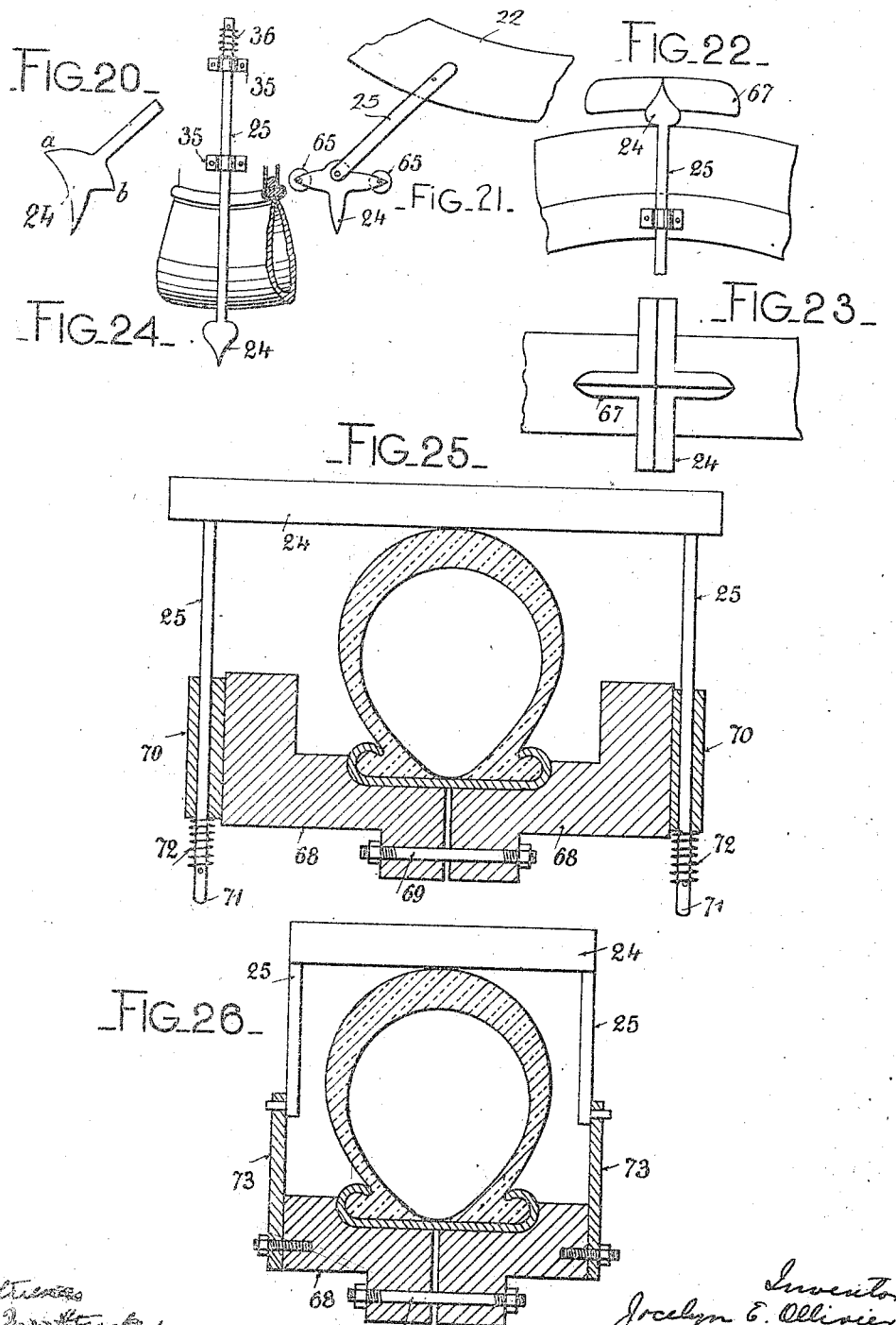

UNITED STATES PATENT OFFICE.

JOCELYN EMILE OLLIVIER, OF LA VIGNETTE ST. GERVAIS, FRANCE.

DEVICE FOR TRANSFORMING A MOTOR-CAR INTO A SLED.

1,225,998.  Specification of Letters Patent.  Patented May 15, 1917.

Application filed October 5, 1914. Serial No. 865,160.

*To all whom it may concern:*

Be it known that I, JOCELYN EMILE OLLIVIER, a citizen of the Republic of France, residing at La Vignette St. Gervais, France, have invented certain new and useful Devices for Transforming a Motor Car into a Sled, of which the following is a specification.

The invention relates to a dismountable device for transforming a motor car into an automobile sledge by using its rear driving wheels.

It consists broadly in providing underneath the front wheels and on the side or in front of the rear wheels, runners fixed to the chassis, and in transforming the rear wheels into driving means comprising movable spikes bearing with their backs on the tire of the wheel. These spikes penetrate with their external portions forming claws, into the snow and thus propel the sledge which is steered by means of the front wheel runners.

The accompanying drawing shows, by way of example, certain constructional forms of the device embodying the invention.

Figure 1 shows the whole of the transformed vehicle.

Figs. 2 and 3 are a side and end elevation, respectively, of the front wheel runners showing the same mounted upon the wheels.

Fig. 4 is a detail of a device for applying the runner on the wheel.

Fig. 5 is a modification of the front wheel runner.

Figs. 6 and 7 are a side and an end elevation, respectively, of a device for mounting the rear runner on the chassis while Figs. 8 to 11 are modifications of the mounting of the rear runners.

Figs. 12 to 15 show in side elevation and in section on lines 13—13, 14—14, 15—15 (Fig. 2) respectively a preferred form of runners made of steel.

Figs. 16 and 17 are sections through other constructions of runners.

Figs. 18 and 19 show in side elevation and in axial section the rear wheel provided with a propelling device in the case of oscillating spikes.

Figs. 20 to 23 show details of different forms of the propelling spikes.

Figs. 24 and 25 are simplified mountings of spikes disposed radially and sliding in slide-ways.

Fig. 26 illustrates a simplified mounting of the spikes upon oscillating rods.

Fig. 27 is an enlarged detail fragmentary view showing the means for throwing the spikes outwardly from the tire after the spikes leave the ground.

In carrying the invention into effect as illustrated, upon each front wheel (see Figs. 2 to 5) a runner 1 is fixed through the medium of a shoe 2 made of wood or other material, and of a steel band 3 surrounding the wheel, secured at a point 4 of the runner and tightened by means of a nut 5; the shoe 2 and the steel band 3 are retained upon the rim by means of collars 6 and stirrups 7, respectively, surrounding the latter. The front runners are thus disposed in the plane of the front wheels and may be pivoted laterally from the steering wheel so as to insure the direction of the vehicle. These runners are adapted to oscillate about the axis of the wheel and with the latter so as to follow the undulations of the ground; to the same end, a transverse axis of articulation 50 may be provided (see Fig. 5) between the shoe 2 and the runner 1, the wheel being then rendered stationary and securely fixed to the chassis by means of rods, belts, or the like means. Finally, it is advantageous that the runner 1 should be able to oscillate about a longitudinal axis 51 (see Figs. 2 and 3) enabling it to bear on transverse uneven parts of the ground.

The rear runners 8 are mounted on the chassis 9 either on the side of the wheels (see Figs 6 and 7) or in front thereof (see Fig. 8) through the medium of suitable springs. In Figs. 6 and 7, these runners 8 are carried by a rod 13 maintained by a stirrup 12 secured to the chassis; a spring 10 is interposed between the rod and the runner the latter being adapted to rotate about a transverse axis 11 (illustrated here above the spring 10 but being also adapted to be provided underneath same) and preferably also about a longitudinal axis 51 so as to follow all the undulations of the ground by remaining in a plane substantially parallel to that of the rear wheel.

This mounting of the rear runner is shown only by way of example, it being clear that it may be effected by any other suitable means. In Fig. 8 the runners 8 are mounted upon the chassis toward one of their ends, by a rod 52 provided with a plate spring 53, and at the other end, by a rod 54 sliding in a slide-way secured to the chassis, pivoted at 55 with the runner and provided with a spring 56 and an adjusting screw indicated diagrammatically by 57. Fig. 9 shows a modification of the construction illustrated in Figs. 6 and 7 in which the rod 13 carrying the rear runner is guided by a slide-way 58 rigidly secured by the rods or standards 59 to the chassis in order to reinforce the runner carrying rod in the longitudinal direction. In Fig. 10 a device has also been provided for preventing the rod 13 carrying the runner from deviating laterally; a steel tube 60 fixed transversely to two longitudinal beams of the chassis 61 carries two arched props 62 secured by their ends to the tube 60 and each provided in its center with a slide-way 63 in which the rod 13 slides; in the modification illustrated in Fig. 11, a single arched prop 64 is fixed in its center to the tube 60 and carries at its two ends the two slide-ways 63 for the runner carrying rods.

It is necessary that in all constructions the rod 13 carrying the runner should be adjustable in order to vary, as desired, the normal level of the runner above the point of contact between the driving wheel and the ground for the purpose of permitting of the adjustment of the load supported by the runner. This adjustment in height of the runner may, moreover, if desired, be utilized for raising completely the runner and placing out of reach of obstructions on the road when the vehicle operates as an ordinary motor car, the driving means described hereinbefore being removed. Even devices may be provided of any construction for varying the height of the runner during motion from the driver's seat; Figs. 6 and 7 illustrate diagrammatically a worm gear 14 with which a worm 15 meshes, controlled by a rod 16; the gear 14 is maintained in place by brackets 17 and operates owing to its rotation the runner carrying rod 13 in a vertical movement. In Figs. 8 et seq. the disposition is the same except that the nut forming the toothed wheel and meshing with the controlling worm is disposed above the longitudinal beam of the chassis. A simplified embodiment of the invention adapted particularly for use on very hard roads may be had by dispensing with the rear runners.

Both front and rear runners are preferably made of slightly flexible steel having the shape shown in Figs. 12 to 15; it will be seen in these figures that the runner is hollow on the inner surface only, in the center of the length thereof, the ends being flat so as to facilitate turning. The forms shown in Figs. 16 and 17 are also advantageous; this shape may be used either throughout the length of the runner or only in the center, the ends being flattened.

The driving mechanism shown in Figs. 18 and 19 is mounted on the rear wheels and disposed as follows:—Two cheeks 18—18' are mounted on the wheel by any suitable means, for instance, by means of the stays 19 which tighten the two cheeks against the rim 20 of the wheel. Upon each of these cheeks and separated therefrom by a washer 21, a ring or plate 22 shaped as an annular crown is mounted and a series of openings 23 are formed in it all along the periphery; spikes 24 provided with rods 25 are pivoted in the openings 23 through the medium of the pins 26 and are thus adapted to oscillate upon these supports; coiled springs 27 secured on the one hand to the cheeks 22 and on the other to the rod 25 tend to maintain the spike 24 radially with respect to the wheel, this movement being limited by a stop 28 of the cheek 22 against which the extension 25' of the rod 25 abuts. The coil spring 27 is wound about the pivot 26, and has one end fixedly attached in a notch or slot 27' in said pin 26, and the other end of the spring is secured about a projection 26' carried by the arm 25 of the spike. It is, of course, obvious that the spring may be connected to the spike and to a relatively fixed point on the cheek 22 in other methods than that disclosed in the drawing. The normal position of the spikes is therefore at a certain distance from the tire. When the wheel turns in the direction indicated by the arrow F (see Fig. 18) the spikes encountering snow, dig in with their points and at the same time bear with their internal surface upon the tire which thus supports the suspension of the vehicle (decreased by the load of the runners).

The spikes having dug into the snow and turning with the wheel, they determine the advancement of the sledge. Thus this driving means is simultaneously a driver and a carrier, but carries only a portion of the load of the vehicle. When leaving the snow the spikes 24 bearing no more on the tire owing to the propelling force, come under the influence of the springs 27 (which may, if necessary, be dispensed with and replaced by the action of the centrifugal force) and move rapidly away from the tire, the effect thereof being the rejection of the snow which may accumulate between the consecutive spikes.

In order to move in a rearward direction, it is necessary to apply the spikes against the tire before they reach the ground. The following is a device fulfilling this purpose:—Upon a stationary part of the vehicle, for instance, upon the brake drum casing, a screw-threaded spindle 29 is provided screwed into a toothed wheel 30 forming a nut. This nut 30 may be rotated through the medium of an appropriate transmission such as a pinion 31 and a controlling rod 32; the spindle 29 carries a plate constituting a suitable cam, and as the rotation of the spindle is prevented, the operation of the pinions 31—30 has the effect of lowering or raising, as desired, the cam 33 guided by any means upon a stationary part of the chassis or upon the brake drum casing. As will be perceived from Fig. 19, the extensions 25' of the driving spike rods abut when moving in a rearward direction, against the outline of the cam 33 when the latter is in the lowered position thus forcing the spikes 24 to bear on the tire in good time.

The illustrated driving mechanism is dismounted in the following manner:—It is sufficient to unscrew the bolts 34 then slide the washers 21 between the cheeks 18—18' and the annular plates 22 and push the latter back against the said cheeks so as to disengage the pins 26 from their holes 23. Instead of the annular plates 22 which can be readily dismantled but are more difficult to assemble, it is preferable to constitute each of them by two halves connected through the medium of diametral flanges; in this manner the spikes may be mounted permanently upon these half-plates which are fitted together or dismantled quite easily by screwing together or unscrewing the said diametral flanges.

The spikes 24 may be of any shape suitable for their purpose; in cross-section their tip will not be directed radially but preferably will form a certain angle therewith, taking into account that the tire receiving the pressure of the spike will slightly flatten and will cause the rod 25—25' to assume a position slightly more inclined under load than the position without any load on as illustrated in the drawings.

The spike may, for instance, have the shape shown in detail in Fig. 20. The part $a, b$ which bears on the tire will be preferably curved inwardly with a surface in proportion to the load to be supported. For large loads the spike may be pivoted to the rods carrying same as shown in Fig. 21; in this manner the spike bearing on the tire will always be in the desired position with respect to the ground; in order to avoid friction between the shoes and the tire the former may be provided with small rollers 65.

In order to prevent skidding, the spikes may be shaped as shown in Figs. 22 and 23 which are a plan and a side elevation respectively, the spike 24 being formed with an edge or member 67 provided at right angles thereto.

In order to avoid an accumulation of snow between the driving spikes, although the driving device itself insures itself the complete freedom of the spikes, other devices than the resilient movement of the spikes (through the medium of the springs 27) described hereinbefore, may be employed.

The rods 25 of the spikes 24 instead of being mounted pivotally as in the construction illustrated in Figs. 18 and 19, may be also slidably mounted as shown in the modification in Fig. 24. In this case the cheeks 18—18' comprise slide-ways 35 in which the rods 25 slide either radially as illustrated, or obliquely; springs such as 36 tend to separate the spikes 24 from the surface of the tire.

The central cheeks 18, Fig. 19, are not indispensable for the mounting of the driving means; it is sufficient that plates 22 carrying the teeth be attached to any suitable elements attached to the wheel, for example, to the wooden ring 68, as shown in Figs. 25 and 26. The wheel is held between two wooden rings 68 tightened and secured by means of the bolts 69; upon these rings radial slideways 70 are provided in which the rods 25 carrying the spikes 24 slide; bolts or pins 71 prevent the rods 25 from leaving their slide-ways and springs 72 apply the back of the spike against the tire. The spikes with their rods 25 are separated from one another and mounted individually. In the device shown in Fig. 26 this simplified individual mounting of the spikes, has been combined with the system of pivoted rods, the latter being pivoted to the annular cheeks 73 secured to the wooden rings 68; in this case the rearward movement cam described hereinbefore, should be employed.

The mountings or fittings with or without the annular cheeks are applicable to metallic and wooden wheels.

Separated driving wheels may be also provided in which the various driving elements (spikes) whatever their mounting may be, are not fitted on the wheel in a detachable but in a permanent manner, the driving wheel being then entirely detachable after the manner of the ordinary detachable wheels.

It is evident that the driving mechanism in its various constructions which have been described and illustrated, may be applied not only to vehicles adapted to be transformed into sledges but also automobile sledges.

What I claim and desire to secure by Letters Patent of the United States is:—

1. A motor sled having a vehicle wheel, a sled runner adapted to be used in conjunction with said wheel to raise the latter from the ground, and driving mechanism for said wheel comprising a number of pivoted spikes, said spikes being adapted to swing outwardly to extract the snow from between the spikes after the spikes are released from contact with the ground.

2. In combination, a wheel, driving mechanism for said wheel comprising a number of spikes, means for pivoting said spikes to said wheel, and means for causing said spikes to swing outwardly to extract the snow from between the spikes.

3. In combination, a wheel, a plurality of spikes pivotally mounted on said wheel, the backs of said spikes being adapted to bear against the rim of said wheel when in contact with the snow, and resilient means associated with said pivoted spikes to cause the backs of said spikes to move from the rim to extract snow, and the like, from between the spikes.

4. The combination with a sled runner, of a sled propeller comprising a vehicle wheel mounted upon said runner, and driving mechanism for said wheel having a number of pivoted spikes mounted on said wheel, the backs of said spikes being adapted to engage against the rim of said wheel when in contact with the snow, and springs associated with said pivoted spikes to cause the backs of said spikes to move from the rim to extract snow and the like from between the spikes.

5. In combination, a vehicle wheel, spikes pivotally mounted to said wheel, said spikes being adapted to engage with their backs against the outer circumference of said wheel and adapted to dig successively into the ground to effect propulsion of the vehicle, and resilient means associated with said pivoted spikes to swing the spikes outwardly to extract snow therefrom and stops on said wheel to limit the pivotal movement of said spikes.

6. In combination, a vehicle wheel, spikes on the wheel adapted to dig successively into the ground to effect propulsion of the vehicle and arms for pivotally connecting said spikes to said wheel, said spikes being pivotally connected to the outer end of said arms.

7. In combination, a vehicle wheel, arms pivotally connected thereto, spikes pivotally connected to the ends of said arms, and wheels on said spikes adapted to engage the tire to avoid friction between the spikes and the outer circumference of the wheel.

8. The combination with a vehicle wheel having the usual felly, of cheeks engaging the felly on either side of said wheel, an annular ring secured to said cheeks and provided with a series of openings, a plurality of spikes, arms for said spikes, and pins on said arms engaging in said openings in said rings whereby said spikes are pivotally mounted to said rings.

9. The combination with a vehicle wheel having the usual felly and a resilient tire about the felly, of cheeks comprising plates engaging the felly on either side of said wheel, an annular ring secured to said cheeks, spacing members between the rings and the cheeks, a plurality of spikes, arms for said spikes, and pins on said arms engaging in openings in said rings whereby said spikes are pivotally mounted.

10. In combination, a vehicle wheel, spikes pivotally mounted on said wheel and adapted to dig successively into the ground to effect propulsion of the vehicle, and means for forcing and maintaining said spikes against the outer circumference of said wheel when it is desired to move the vehicle on which the wheel is mounted in a rearward direction.

11. In combination, a vehicle wheel, spikes pivotally connected to said wheel and adapted to dig successively into the ground to effect propulsion of the vehicle, said spikes all being inclined at an angle to the radii of said wheel, and means for forcing and maintaining said spikes with their backs against the outer circumference of said wheel when said wheel is revolved in a reverse direction.

12. In combination, a wheel, pivoted spikes on said wheel adapted to successively dig into the ground to effect propulsion of the vehicle, said spikes being inclined at an angle to the radii of said wheel, and a cam for forcing and maintaining said spikes with their backs against the outer circumference of said wheel when it is desired to move the vehicle on which the wheel is mounted in a rearward direction.

13. In combination, a wheel, pivoted spikes on said wheel adapted to successively dig into the ground to effect propulsion of the vehicle, said spikes being inclined at an angle to the radii of said wheel, a cam for forcing and maintaining said spikes with their backs against the outer circumference of said wheel when it is desired to move the vehicle on which the wheel is mounted in a rearward direction, and means for radially adjusting said cam.

14. In combination, a vehicle wheel and driving mechanism for said wheel comprising a number of spikes extending transversely to the plane of the wheel and across the periphery thereof, arms on either face of the wheel to the lower ends of which the spikes are connected, means upon the wheel for mounting the spikes so as to bear with their backs against the periphery of the wheel when in contact with the ground, and means adapted to swing said spikes from the periphery upon moving from contact with the ground.

15. In combination, a vehicle wheel, arms pivotally connected thereto, and spikes pivotally connected to said arms and having swinging movement relative to the rim of the wheel.

16. In combination, a vehicle wheel, arms pivotally connected at one end thereto and having a free swinging movement at the other end, and spikes pivoted to said arms.

17. In combination, a wheel, a plurality of spikes, arms carrying said spikes and pivotally mounted intermediate their ends on said wheel, a cam on one side of said wheel comprising a plate having a cam edge against which the inner ends of the arms are adapted to engage for forcing and maintaining said spikes with their backs against the outer circumference of the wheel when it is desired to move the vehicle on which the wheel is mounted in a rearward direction.

In testimony whereof I have signed my name to this specification in the presence of two subscribing witnesses.

JOCELYN EMILE OLLIVIER.

Witnesses:
A. TRILLAT,
LOUIS H. MUNIER.